US012695692B2

(12) United States Patent

Song

(10) Patent No.: US 12,695,692 B2

(45) Date of Patent: Jul. 28, 2026

(54) PERFORMANCE MEASUREMENT IN A SEGMENT ROUTING NETWORK

(71) Applicant: Huawei Technologies Co., Ltd., Shenzhen (CN)

(72) Inventor: Haoyu Song, San Jose, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 506 days.

(21) Appl. No.: 18/334,208

(22) Filed: Jun. 13, 2023

(65) Prior Publication Data

US 2023/0327983 A1 Oct. 12, 2023

Related U.S. Application Data

(63) Continuation of application No. PCT/US2021/021439, filed on Mar. 9, 2021.

(60) Provisional application No. 63/125,212, filed on Dec. 14, 2020.

(51) Int. Cl.
*H04L 45/00* (2022.01)
*H04L 43/12* (2022.01)
*H04L 45/12* (2022.01)

(52) U.S. Cl.
CPC .............. *H04L 45/34* (2013.01); *H04L 43/12* (2013.01); *H04L 45/123* (2013.01)

(58) Field of Classification Search
CPC ..... H04L 43/20; H04L 45/66; H04L 43/0835; H04L 45/50; H04L 41/40; H04L 45/302; H04L 45/34; H04L 45/306
See application file for complete search history.

(56) References Cited

U.S. PATENT DOCUMENTS 10,917,340 B2 * 2/2021 Gandhi .............. H04L 43/0835
2020/0084147 A1 * 3/2020 Gandhi .................. H04L 43/20
2020/0099611 A1 * 3/2020 Filsfils .................. H04L 45/302

OTHER PUBLICATIONS

F. Brockners et al., VXLAN-GPE Encapsulation for In-situ OAM Data; draft-brockners-ippm-ioam-vxlan-gpe-03, IETF; 1 Standardworkingdraft, Internet Society (ISOC) 4, No. 3 Nov. 4, 2019 (Nov. 4, 2019), pp. 1-11, XP015136096.

International Search Report and Written Opinion dated Sep. 16, 2021, International Application No. PCT/US2021/021439.

Brockners, F. et al., "VXLAN-GPE Encapsulation for In-situ OAM Data; draft-brockners-ippm-ioam-vxlan-gpe-03", Nov. 4, 2019, pp. 1-11.

Brockners, F. et al., "Data Fields for In-situ OAM; draft-ietf-ippm-ioam-data-04", Oct. 20, 2018, pp. 1-39.

Brockners, F. et al., "Data Fields for In-situ OAM; draft-ietf-ippm-ioam-data-11", Nov. 22, 2020, pp. 1-45.

(Continued)

*Primary Examiner* — Mahran Y Abu Roumi

(57) ABSTRACT

The present technology discloses generating and transmitting a probing packet for determining in-situ performance in a segment routing (SR) network. A packet is received at a SR network node having an IPv6 packet header, and a probing packet is generated that includes the IPv6 packet header, a segment routing header (SRH) extension header, and a UDP header structure and UDP data payload portion. The UDP payload portion includes an OAM header and a IOAM data structure. The probing packet is then transmitted to a next segment node in the SR network.

20 Claims, 7 Drawing Sheets

(56)          References Cited

OTHER PUBLICATIONS

Ali, Z. et al., "Operations, Administration, and Maintenance (OAM) in Segment Routing Networks with IPV6 Data plane (SRv6); draft-ali-spring-srv6-oam-00.txt", Feb. 26, 2018, pp. 1-21.

Ali, Z. et al., "Operations, Administration, and Maintenance (OAM) in Segment Routing Networks with IPv6 Data plane (SRv6); draft-ietf-6man-spring-srv6-oam-08", Oct. 30, 2020, pp. 1-22.

Song, H. et al., "SRv6 In-situ-Active Measurement; draft-song-spring-siam-00", Dec. 15, 2020, pp. 1-7.

Pan, T. et al., "In-band Network-Wide Telemetry; draft-tian-bupt-inwt-mechanism-policy-00", Apr. 28, 2020, pp. 1-15.

Pan, T. et al., "In-band Network-Wide Telemetry; draft-tian-bupt-inwt-mechanism-policy-01", Oct. 25, 2020, pp. 1-15.

Postel, J. "User Datagram Protocol", Aug. 28, 1980, pp. 1-3.

Deering, S. et al., "Internet Protocol, Version 6 (IPv6) Specification", Jul. 2017, pp. 1-42.

Filsfils, C. et al., "IPv6 Segment Routing Header (SRH)", Mar. 2020, pp. 1-27.

Mirsky, G. et al., "Simple Two-Way Active Measurement Protocol", Mar. 2020, pp. 1-15.

International Preliminary Report on Patentability dated Jun. 29, 2023, International Application No. PCT/US2021/021439.

* cited by examiner

500

| Version 202 | Traffic Class 204 | Flow Label 206 | |
| --- | --- | --- | --- |

| Payload Length 208 | Next Header 210 | Hop Limit 212 |
| --- | --- | --- |

Source Address 214

Destination Address 216

302

| Next Header: UDP | Hdr Ext Len 304 | Routing Type 306 | Segments Left 308 |
| --- | --- | --- | --- |
| Last Entry 310 | 1 | Flags | Tag 314 |

312

Segment List [0] - [n] (128-bit IPv6 Address) 316

404

200

300

| Source Port 402 | Destination Port |
| --- | --- |
| Length 406 | Checksum 408 |

501

| Namespace-ID 502 | NodeLen 504 | Flags 506 | RemainingLen 508 |
| --- | --- | --- | --- |
| IOAM-Trace-Type 510 | | Reserved 512 | |

Node Data List [1...n] 514

400

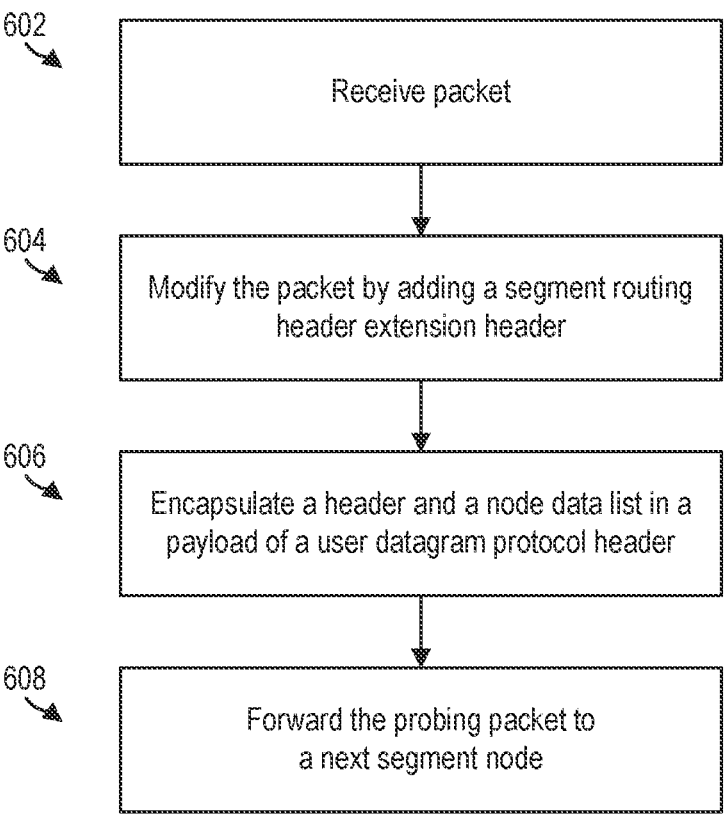

602

Receive packet

604

Modify the packet by adding a segment routing header extension header

606

Encapsulate a header and a node data list in a payload of a user datagram protocol header

608

Forward the probing packet to a next segment node

*FIG. 6*

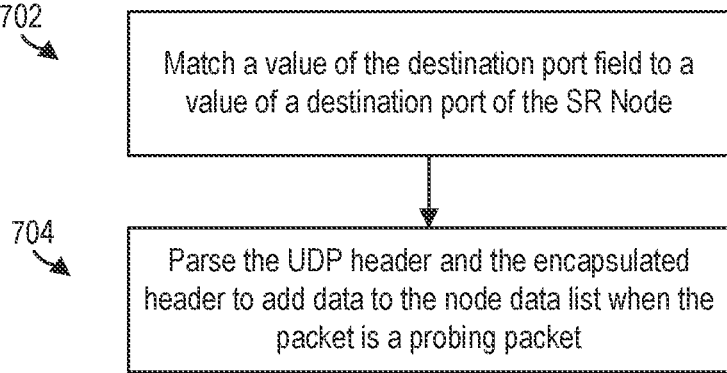

702

Match a value of the destination port field to a value of a destination port of the SR Node

704

Parse the UDP header and the encapsulated header to add data to the node data list when the packet is a probing packet

*FIG. 7*

PERFORMANCE MEASUREMENT IN A SEGMENT ROUTING NETWORK

CLAIM FOR PRIORITY

This application is a continuation of, and claims priority to, PCT Patent Application No. PCT/US2021/021439, entitled "Performance Measurement in a Segment Routing Network", filed Mar. 9, 2021, which claims priority to U.S. Provisional Patent Application No. 63/125,212, entitled "SRV6 In-situ Active Measurement", filed Dec. 14, 2020, which applications are incorporated by reference herein in their entirety.

FIELD

This disclosure generally relates to performance measurement in a segment routing network.

BACKGROUND

Segment-routing (SR) is a technology that greatly simplifies network operations and makes networks Software Defined Network (SDN)-friendly. SR is applicable to dataplanes such as the Multiprotocol Label Switching (MPLS) (typically referred to as 'SR-MPLS') data-plane and the Internet Protocol version 6 (IPv6) (typically referred to as 'SRv6') data-plane. Furthermore, SR technology is to be used with network slicing to provide services in 3rd Generation Partnership Project (3GPP) 5th Generation (5G) networks. For the new 5G networks, service providers are planning to deliver Ultra-Reliable Low-Latency Communication (URLLC) services. Traffic flows through 5G network paths are expected to satisfy certain constraints as defined in customer Service Level Agreements (SLAs). For example, services such as tele-medicine, on-line gaming, autonomous connected cars, stock market trading and many more.

SUMMARY

According to one aspect of the present disclosure, there is a method of generating and transmitting a probing packet for determining in-situ performance in a segment routing (SR) network, comprising receiving a packet at a SR network node having an IPv6 packet header; generating the probing packet to include the IPv6 packet header, a segment routing header (SRH) extension header, and a UDP header structure and UDP data payload portion; wherein the UDP payload portion includes an OAM header and a IOAM data structure; and transmitting the probing packet to a next segment node in the SR network.

Optionally, in any of the preceding aspects, wherein an IP header of the received packet includes a source address field and a destination address field, wherein a source address is an address of a SR source node and a destination address is an address of a SR segment endpoint node.

Optionally, in any of the preceding aspects, wherein the probing packet originates at the source address of a SR source node and terminates at the destination address of a SR endpoint node at an end of a SR path.

Optionally, in any of the preceding aspects, wherein the SRH extension header lists the SR segment endpoint nodes for which the probing packet will measure and collect data.

Optionally, in any of the preceding aspects, wherein the UDP header further includes a source port field used as a sequence number to track the probing packet on a SR path.

Optionally, in any of the preceding aspects, wherein the UDP header further includes a destination port field to define the payload type.

Optionally, in any of the preceding aspects, the method further comprising modifying, by the SR node, a value of the destination port field to define the payload type.

Optionally, in any of the preceding aspects, wherein the encapsulated header is one of an in-situ operations, administration and management (IOAM) header, an IOAM edge-to-edge (E2E) header, an IOAM DEX header or a telemetry header as defined by the value of the destination port field.

Optionally, in any of the preceding aspects, the SRH extension header comprises a flag field identifying the packet as a probing packet.

Optionally, in any of the preceding aspects, the method further comprising matching a value of the destination port field to a value of a destination port of the SR node, and parsing, by the SR node, the UDP header and the OAM header to add data to the node data list when the flag field is set to indicate the packet is the probing packet and the value of the destination port field matches the value of the destination port of the SR node.

According to one aspect of the present disclosure, there is a segment routing node for generating and transmitting a probing packet for determining in-situ performance in a segment routing (SR) network, a non-transitory memory storage comprising instructions; and one or more processors in communication with the memory, wherein the one or more processors cause the segment routing node to execute the instructions to: receive a packet at a SR network node having an IPv6 packet header; generate the probing packet to include the IPv6 packet header, a segment routing header (SRH) extension header, and a UDP header structure and UDP data payload portion; wherein the UDP payload portion includes an OAM header and a IOAM data structure; and transmitting the probing packet to a next segment node in the SR network.

According to one aspect of the present disclosure, there is a non-transitory computing-readable medium storing computer instructions for measuring in-situ performance in a segment routing (SR) network, that when executed by one or more processors, cause the one or more processors to perform the steps of generating and transmitting a probing packet for determining in-situ performance in a segment routing (SR) network, comprising receiving a packet at a SR network node having an IPv6 packet header; generating the probing packet to include the IPv6 packet header, a segment routing header (SRH) extension header, and a UDP header structure and UDP data payload portion; wherein the UDP payload portion includes an OAM header and a IOAM data structure; and transmitting the probing packet to a next segment node in the SR network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are it lustrated by way of example and are not limited by the accompanying figures for which like references indicate elements.

FIG. 6 illustrates an example flow diagram of measuring performance in a segment routing network.

FIG. 7 illustrates another example flow diagram of measuring performance in a segment routing network.

DETAILED DESCRIPTION

The present disclosure will now be described with reference to the figures, which generally relate to performance measurement in a segment routing network.

The technology describes an in-situ active measurement method for segment routing on IPv6 (SRv6). A packet is constructed that modifies the IPv6 header to include a Segment Routing Header (SRH) with a flag bit set to identify the packet as a probing packet. The modified packet header further appends a UDP header in which the payload data of the UDP is replaced with an In-situ Operations, Administration and Management (IOAM) header. That is, the IOAM header is encapsulation in the UDP payload. In one embodiment, the probing packet originates from a segment source node and terminates at a segment endpoint node. Each segment node on the path, when detecting the flag is set, parses the UDP header and the IOAM header, and adds data to the IOAM node data fields.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications, and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Conventionally, to support segment routing in IPv6 (SRv6), various mechanisms are used to collect data and measure the performance of the SRv6 network. Some of the mechanisms for SRv6 OAM are disclosed in the document [I-D.ietf-6man-spring-srv6-oam], the contents of which are hereby incorporated by reference. More general methods for performance measurement can be applied for SRv6 as detailed in [RFC8762], the contents of which are hereby incorporated by reference. However, these methods have limited data coverage and measurement capability.

The document [I-D.ietf-ippm-ioam-data], the contents of which are hereby incorporated by reference, supports extensible data collection for user traffic, which is beneficial for SRv6. However, IOAM's overhead may cause packet fragmentation and affect packet forwarding throughput in the network. Moreover, due to the extension header limitations asserted by [RFC8200], the contents of which are hereby incorporated by reference, encapsulating the IOAM header and data in SRv6 user packets is difficult.

Figures 1A, 1B:
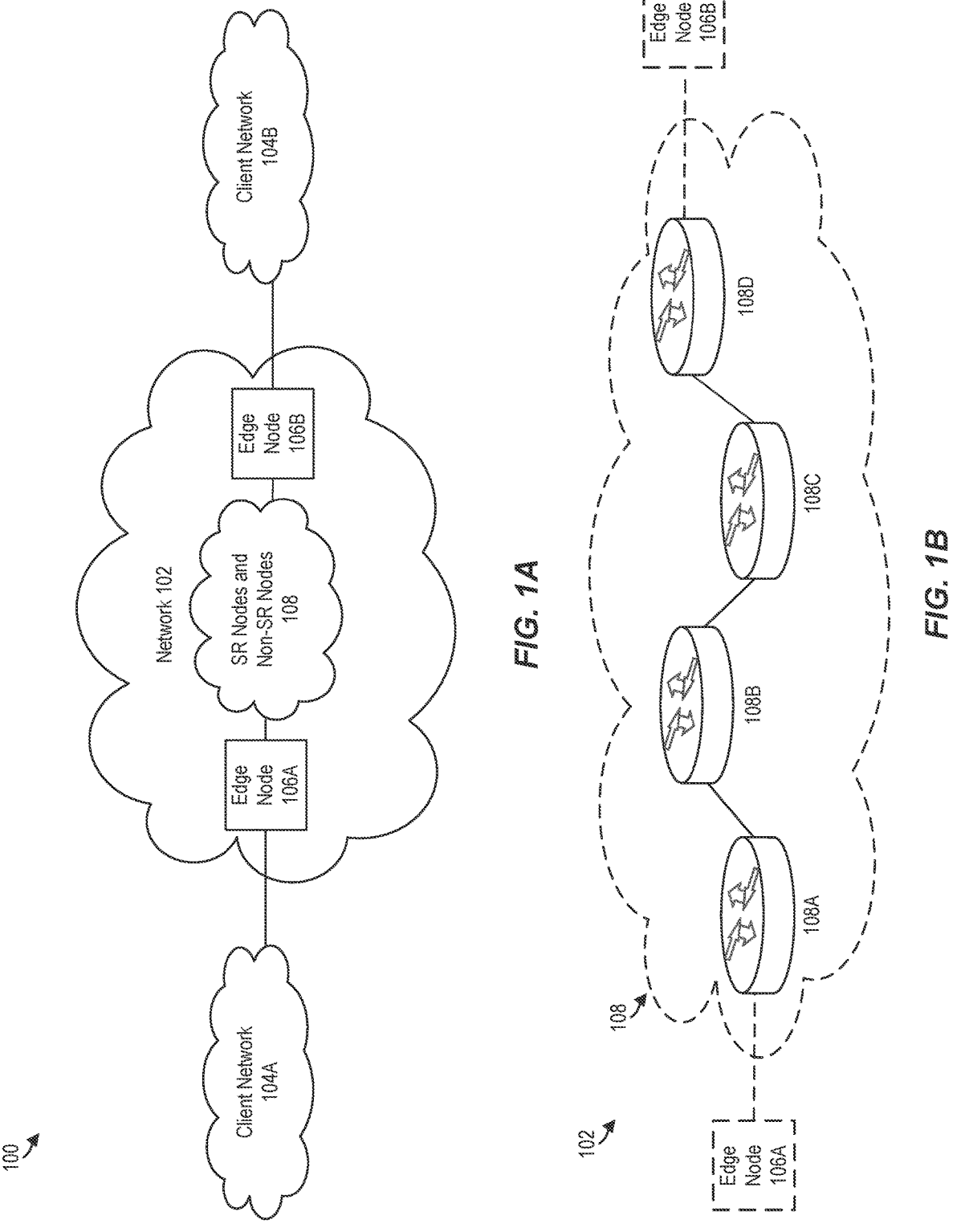
FIG. 1A illustrates a system with a segment routing network.
FIG. 1B illustrates an example of an IPv6 network that is a segment routing enabled network.

FIG. 1A illustrates a system with a segment routing network. Segment routing (SR) is a mechanism in which nodes forward packets using SR forwarding tables and segment IDs. The term 'packet' may be used in a generic sense to include packets, frames, segments, datagrams, and/or other generic data units that may be used to transmit communications (e.g., data and/or commands) in a network. A packet is a formatted unit of data that can contain control or routing information (e.g., source and destination address, etc.) and data, which is also sometimes referred to as a payload. In some embodiments, control or routing information, management information, or the like can be included in packet fields, such as within header(s) and/or trailer(s) of packets. Communications in a network environment can be sent and received according to any suitable communication protocols.

SR enables very fast and simple forwarding engines in the data plane of nodes. SR nodes (i.e., nodes employing SR) make packet forwarding decisions based on the segment IDs. Packets can enter an SR enabled network (i.e., a network of nodes that are SR enabled) via an ingress edge node, travel hop-by-hop along a segment path (SP) that includes one or more core nodes, and exit the network via an egress edge node. Segment IDs may correspond to topological segments of a network, services provided by network nodes, etc. Topological segments represent one-hop or multi-hop paths to SR nodes. Topological segments act as sub-paths that can be combined to form an SP.

Edge nodes and/or other devices (e.g., a centralized control plane server) of an SR network use routing information (nodal segment IDs bound to loopbacks, adjacency segment IDs mapped to link IDs, etc.) they receive in link advertisements to create ordered lists of segment IDs (i.e., segment ID stacks). Segment ID stacks correspond to respective SPs. Individual segment IDs in a segment ID stack may correspond to respective segments or sub paths of a corresponding SP.

In the depicted embodiment, system 100 includes client networks 104A and 104B external to a network, such as segment routing (SR) network 102. The SR network 102 includes SR edge nodes 106A and 106B and network nodes 108. The SR edge nodes 106A and 106B may be network elements (e.g., routers) that are located on a customer's premises that provide an interface to/from a provider's core network. The network nodes 108 may include SR nodes that are SR-capable network nodes and optionally non-SR-capable network nodes, in that they do not process a segment routing header or segment identifier but can forward and route IP and/or other packets, SR gateways, and office administration and management (OAM) controller(s). In one embodiment, SR edge nodes 106A and 106B typically encapsulate native packets received from networks 104A and 104B into SR packets according to a data plane ascertained SR policy, and subsequently decapsulate native packets from SR packets and forward the native packets into network 104A and 104B. It is appreciated that any number of components (e.g., edge nodes, SR nodes, etc.) or networks (e.g., client networks, SR networks, etc.) may be added to or removed from the system, and that the illustrated embodiment is merely one example.

An SR policy is defined in the Internet Engineering Task Force (IETF) Segment Routing Policy for Traffic Engineering publication, available at "tools.ietf.org/html/draft-fils-fils-spring-segment-routing-policy", the contents of which are hereby incorporated by reference, and are used to steer traffic through a specific, user-defined path using segmentlists, which consist of Segment Identifiers (SIDs), for traffic engineering (TE) purposes. Segment lists can be carried in a label stack of Multiprotocol Label Switching (MPLS) labels for SR-MPLS data packets or in IPv6 addresses for SR over IPv6 (SRv6) data packets.

In one embodiment, when a SR edge node 106A and 106B or an SR node in network 102 receives a packet, for example from a client network 104A or 104B, a SR policy (e.g., list of segment identifiers) is determined through and/or to which to forward a SR packet, possibly identifying OAM functionality via one or more (global or local) OAM segment identifiers and/or to set or clear the O-Flag in a segment routing header. These policies can change in response to network conditions, network programming, etc. In one embodiment, the SR policy specifies to add one or more SR headers or simply one or more segment identifiers, resulting in a SR packet having one or more SR headers, each with one or more segment identifiers and in one embodiment, with OAM signaling.

In another embodiment, a native packet is received without a SR header, and the SR edge node 106A or 106B or an SR-capable node within network 108 encapsulates the native packet in a SR packet including one or more added SR headers, each including one or more segment identifiers (e.g., one or more OAM and/or non-OAM segment identifiers), and possibly other OAM signaling information (e.g., an OAM flag set or cleared, a time length value (TLV) indicating OAM signaling, etc.). In a further embodiment, a SR packet is received with a SR header, and the SR edge node 106A or 106B or an SR-capable node within network 108 adds one or more SR headers resulting in a SR packet including one or more added SR headers, each including one or more segment identifiers.

FIG. 1B illustrates an example of an IPv6 network that is a segment routing enabled network. Segment routing (SR) has advantageous properties, some of which are discussed above. However, some networks do not inherently provide SR functionality. For example, a native IPv6 network uses IPv6-compatible protocols in the control plane and data plane. This means that the control protocols which nodes use to exchange forwarding information in an IP network do not explicitly support SR. Likewise, the data plane in some IPv6 networks, if not modified, does not support SR forwarding operations. However, one feature provided by IPv6 is the capability to define extension headers. Extension headers are optional headers used to carry additional information in a packet header. Extension headers are placed in the packet between the fixed IPv6 header and an upper-layer protocol header (e.g., a TCP header).

To use SR in an IP network, such as the network shown in FIG. 1, modifications are made to the IPv6 data plane that allow a packet to encode a list of segments (e.g., a segment ID stack) in an IPv6 packet header and forward the packet according to the list of segments. This is accomplished using the extension headers provided by IPv6. One type of extension header is an SR extension header that includes a segment list, or segment ID stack, that is used to forward a packet along the SP defined by the segment ID stack. This is known simply as an SR extension header. A second type of extension header is an SR trace header. An SR trace header provides operation, administration, and management (OAM) functions, such as collecting information identifying the route taken by a packet, whether the packet was rerouted, and the like.

As noted, in the depicted embodiment, the network is a native IPv6 network. The nodes in the network are configured to use IPv6 in the control and data plane. The network includes an SR network 102 that includes several nodes that are configured to use SR to forward packets. These are SR nodes 108A-108D that collectively form network nodes 108. The network nodes 108 may also include non-SR nodes that do not use SR to forward packets. Instead, they use another packet forwarding mechanism, such as IPv6. Additionally, it is appreciated that the SR network 102 can include any number of nodes in between the nodes shown.

Each of the SR nodes 108A-108D may have interfaces that are identified as shown. For example, SR node 108A has two interfaces—one on the edge node 106A side and one on the SR node 108B side. Each of the SR nodes 108A-108D is assigned a unique loopback. Loopbacks may be assigned to each of the nodes SR 108A-108D. These loopbacks are unique in the network and can be used for several purposes, such as calculating the topology of SR network 102, which in turn can be used to create SPs and/or to identify SPTs and thus next hop egress interfaces, for SR forwarding tables.

As illustrated, edge node 106A is an ingress node for the SR network 102. Edge node 106A is configured to receive packets that are not SR packets, e.g., packets that do not contain SR information, and modify the packets such that the packets can be forwarded by SR nodes using SR. In one embodiment, this involves adding a SR extension header to a packet, as described further below. Edge node 106A can also add a trace extension header to provide OAM functions for packets forwarded using SR, also described further below. The SR extension headers are used by the SR nodes to forward packets using SR and record information regarding the forwarding. That is, forwarding operations are performed by the SR nodes based upon the segment identifiers (IDs) included in the segment list. Edge node 108D is an egress edge node for the SR nodes 108. Edge node 108D can remove SR information, such as SR extension headers, from the packet before forwarding the packet out of the SR domain 102.

Continuing with FIG. 1B, the nodes (or elements) of SR network 102 may be endpoints of any of a variety of types, such as routers, servers, switches, data storage devices, gateways, as well as networking appliances, such as firewalls, intrusion detection systems, etc. The endpoints may be physical, virtual (e.g., implemented in software), or any combination thereof. In an example embodiment, the SR nodes 108A, 108B, 108C, 108D may be routers that are configured to route packets through SR network 102, including routing packets between edge node 106A and edge node 106B. The network nodes, and/or systems discussed for various embodiments described herein can couple to one another through simple interfaces (as illustrated) and/or through any other suitable connection (wired or wireless), which provides a viable pathway for network communications. Additionally, any one or more of the network elements, network nodes, and/or systems may be combined or removed from a given deployment based on a particular configuration and/or implementation.

Although only four network nodes and two edge nodes are illustrated in the embodiment of FIG. 1B, it is to be understood that any number of elements and/or nodes may be provided in a network environment in accordance with embodiments described herein.

Figure 2:
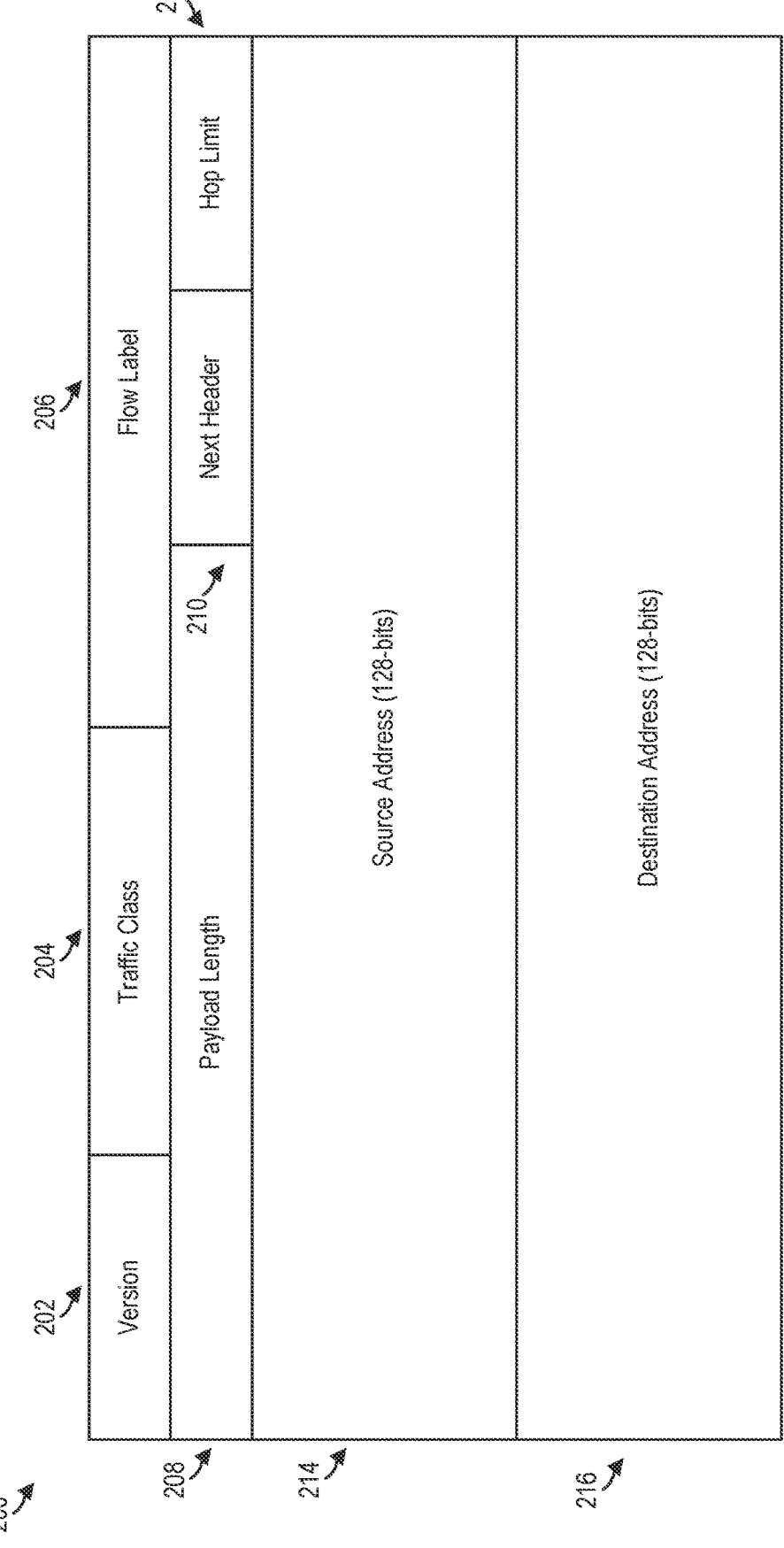
FIG. 2 illustrates an Internet Protocol version 6 header format that is used in an IPv6 network.

FIG. 2 illustrates an IPv6 header format that is used in an IPv6 network. The IPv6 header 200 has a length of forty octets that are divided into fields as shown. As illustrated, the first section of the header 200 is the version number field 202 that defines the version of the Internet Protocol and includes four bits. The next section of the header 200 is the traffic class field 204 that also includes four bits. Following the traffic class field 204 is a flow label field 206 that is twenty-four bits in length. The next section of the header is a payload length field 208, which is a sixteen bit segment. The payload length field 208 is followed by the next header segment field 210 having a length of eight bits, followed immediately by the hop limit field 212 that includes eight bits. Thus, the portion of the header 200 leading up to the address segments comprises one hundred sixty bits of information.

Following the initial portion of the header 200, the IPv6 header format includes a source address 214 which has a length of one hundred twenty eight bits, and a destination address 216 which is also a one hundred twenty eight bit address. In this respect, the IPv6 header format 200 expands both the source address 214 and the destination address 216 to a one hundred twenty eight bit address as compared to the IPv4 format in which both the source address and the destination address were thirty-two bit sections. As understood from the figure, the entire header 200 in the IPv6 format is forty octets in length and precedes the information payload that is transmitted over the Internet.

In IPv6, optional internet-layer information is encoded in separate headers that may be placed between the IPv6 header and the upper layer header in a packet. As noted above, these optional headers are referred to as extension headers and may be identified by the next header field 210 value. In the case of header 200 in the depicted embodiment, the next header is an IPv6 segment routing header (SRH), or SRv6.

Figures 3A, 3B, 4:
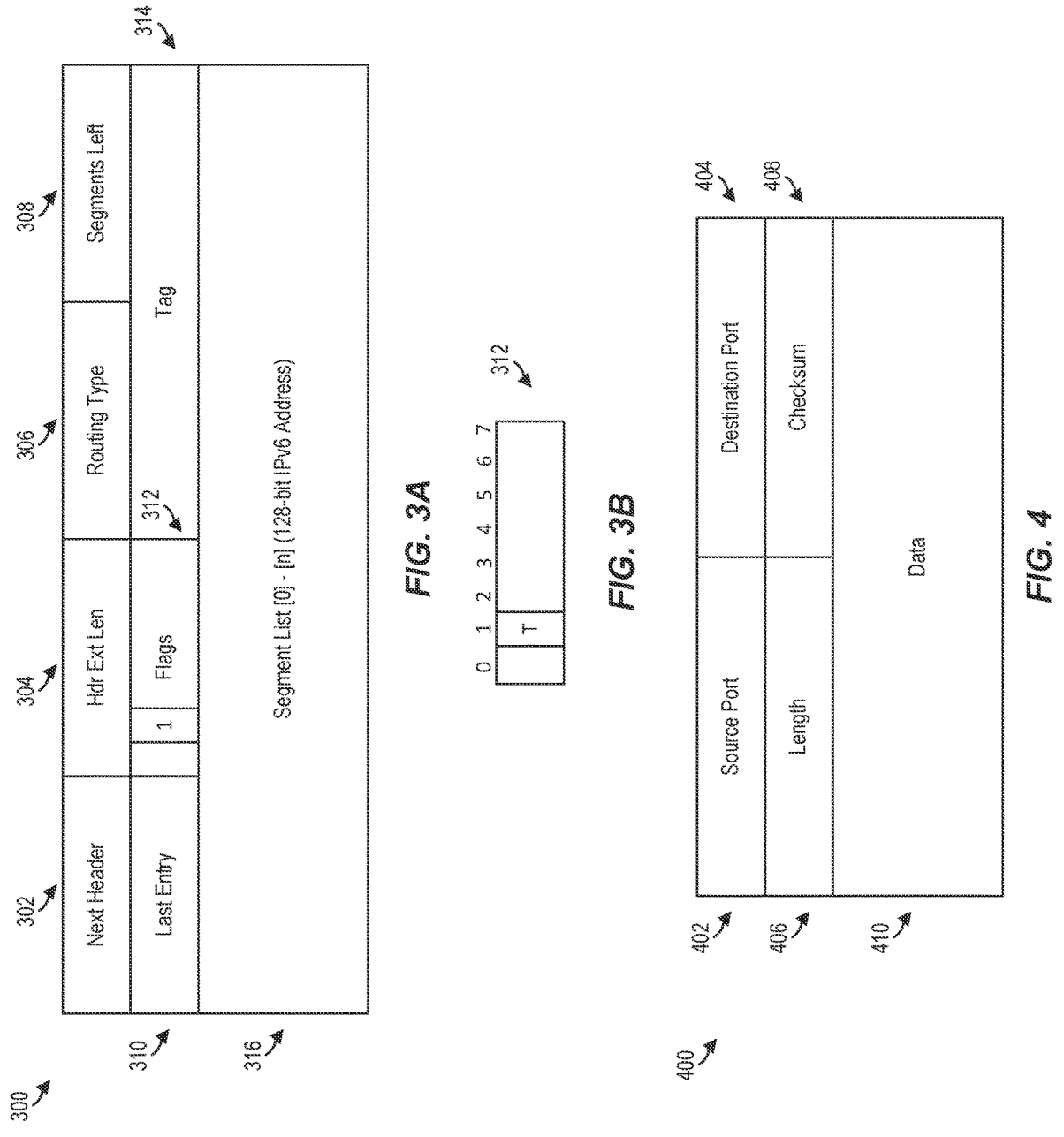
FIG. 3A illustrates an Internet Protocol version 6 (IPv6) Segment Routing Header (SRH).
FIG. 3B illustrates example flag bits in accordance with the IPv6 SRH of FIG. 3A.
FIG. 4 illustrates an example user datagram protocol (UDP) header structure and UDP data.

FIG. 3A illustrates an IPv6 SR Header. Since segment routing with IPv6 (SRv6) adds a new type of routing extension header, existing IPv6 OAM mechanisms can be used in an SRv6 network. In one embodiment, SR can be applied to the IPv6 data plane using a routing header called the segment routing header (SRH). The SRH 300, which is an extension header of the IPv6 header, has a number of fields including a next header field 302, a header extension length (hdr ext len) field 304, a routing type field 306, a segments left field 308, a last entry field 310, a flags field 312, a tag field 314, one or more segment lists field 316 and an optional TLV field 316.

The SRH 300 may be used to route packets through segments of the network 102. The SRH 300 fields are defined as follows. The next header field 302 is an 8-bit selector that identifies the type of packet header of the packet that immediately follows SRH 300. In one embodiment, and as explained further below, the type of packet header that immediately follows the SRH 300 is a user datagram protocol (UDP) header packet structure 400 (FIG. 4).

The hdr ext len field 304 is an 8-bit unsigned integer that specifies the length of SRH 300 in 8-octet units, not including the first 8 octets. The routing type field 306 identifies the routing type, as assigned by the Internet Assigned Numbers Authority (IANA). The segments left field 308 includes the index, in the segment list 316, of the next segment to inspect. This field includes the number of route segments remaining, i.e., the number of explicitly listed intermediate nodes still to be visited before reaching the final destination. In the last entry field 310, the field includes the index of the last entry in segment list 316.

The flags field 312 creates an IANA registry for new flags to be defined. For example, as shown in FIG. 3B, there are 8 bits (bits 0-7) of flags that are currently unused and for future use. In one embodiment, one of the unused flag bits, when set, may be defined to indicate that the packet type. For example, the flags fields 312 may include an "0-flag" that indicates an OAM enhancement for SRv6 networks. The O-flag is used as a marking bit to trigger telemetry data collection and export at the segment endpoints. In one further embodiment, and as depicted in the flags field 312, one of the bits is set to "1." This bit may be referred to as a "T-flag" bit in which to designate the packet as a dedicated probing packet for active measurement. Setting of the T-flag bit is discussed further below.

The tag field 314 may tag a packet as part of a class or group of packets—e.g., packets sharing the same set of properties.

The segment list 316 includes the set of addresses (e.g., IPv6 addresses, etc.) that represent the segments for the intended path. This list is encoded starting with the last segment of the path (e.g., index [0] is the last segment of the intended path and index[n] is the first segment of the intended path). Segments left field 308 index is used in conjunction with segment list 416 to indicate the currently active segment. There is also an Optional Type-Length-Value (TLV) Objects field, not shown. The TLV objects can be used by the destination address, such as additional information about the source device.

The fields of SRH 500 are defined and described in more detail in the IPv6 Segment Routing Header (SRH) document (draft-ietf-6man-segment-routing-header), the contents of which are hereby incorporated by reference.

FIG. 4 illustrates an example user datagram protocol (UDP) header structure and UDP data. The UDP packet structure 400 includes a source port field 402, a destination port field 404, a length field 406, a checksum field 408, and a data field 410. The source port field 402 is an optional field that, when used, indicates the port of the send process and may be assumed to be the port to which a reply should be addressed in the absence of any other information. If not used, a value of zero may be provided. The destination port field 404 may be used to indicate a particular internet destination address. In one embodiment, as explained further below, the destination address may be used to designate a type of payload. The length field 406 includes the length in octets of the datagram, including the header information (402, 404, 406, 408) and the data field 410. The checksum field 408 includes a checksum of data from the IP header, the UDP header, and the UDP data, according to the User Datagram Protocol. The data field 410 includes the payload data to be delivered to a destination. In one embodiment, an In-situ OAM (IOAM) header is inserted as the UDP payload data, as described below with reference to FIG. 5.

One mechanism used in computer networks is a traceroute tool that may discover a path a packet takes from an originating node to a destination node. A traceroute can be used on IP networks, such as IPv6 networks, and may be implemented by sending a series of messages addressed to the destination beginning with a time-to-live (TTL) value of one in the first message and incrementing the TTL value in each successive message until the destination node is reached. When a message passes through a network device, such as a router or a gateway, the TTL value is decremented by one before forwarding the message to the next network device to keep it moving on its way to the remote destination. When the TTL becomes zero, the receiving network device will discard the message and respond with an error message indicating that the message's time to live has expired. When a message reaches its destination, different techniques can be used to indicate that the message's destination has been reached. However, a traceroute only returns the response packet to the probing packet source. Collected data is may not be exported to other locations.

In many applications of traceroute, the data field 410 of the UDP packet is irrelevant because the key information of a traceroute packet is the Internet Protocol (IP) TTL value. However, in some embodiments, the data field 410 may be used to extend the functionality of traceroute by including information in the data field 410 to be read and used by nodes in the network. The information may include informational data, identification data, command data, request data, or performance measurement data in various example embodiments. Thus, a method of providing extended functionality to traceroute includes appending data structures in the data field 410. In one embodiment, the appended data structure is an IOAM header and data. Similar to the above, while the traceroute in this embodiment may collect data, each router on the path will generate a single packet and the packet will be sent back to the source.

Figure 5:
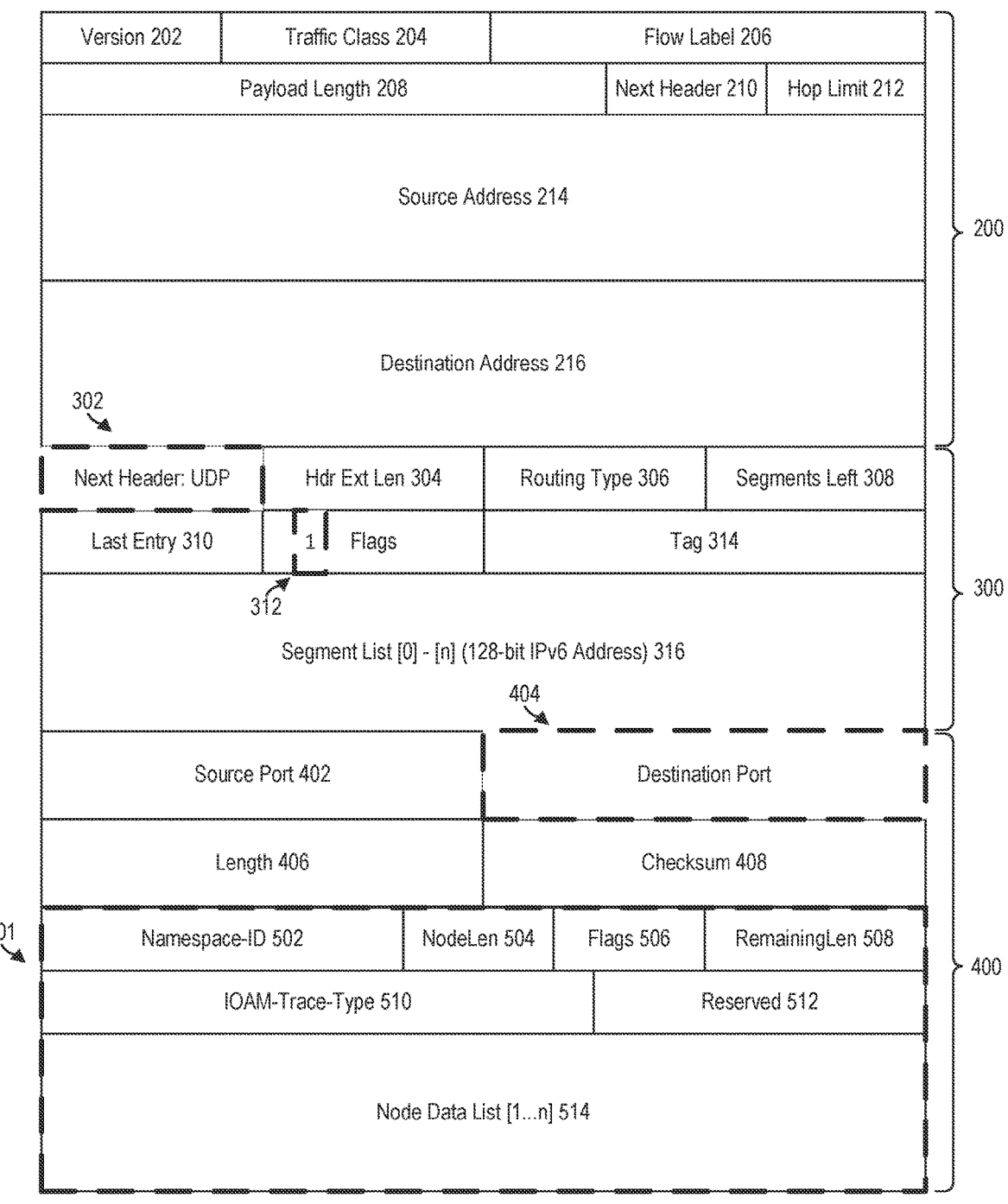
FIG. 5 illustrates a probing packet in accordance with embodiments of the disclosure.

FIG. 5 illustrates a probing packet in accordance with embodiments of the disclosure. As illustrated, the probing packet 500 includes the IPv6 header 200, the SRH 300 within the UDP packet structure 400 in which the data field 410 is replaced with an in-situ (or in-band) OAM (IOAM) header and data structure 501. IOAM, similar to a traceroute mechanism, records OAM information within a packet while the packet traverses a network (IOAM) domain, such as network 102. IOAM accommodates different uses and includes IOAM data fields that fall into different categories for different uses. These categories are referred to as IOAM option types, two of which are a pre-allocated trace option type and an incremental trace option type.

The IOAM traverses the IOAM domain, which includes IOAM encapsulating nodes, IOAM decapsulating nodes and IOAM transmit nodes. IOAM encapsulating nodes and decapsulating nodes add and remove IOAM option types, respectively, whereas an IOAM transit node are aware of IOAM data and read and/or write or process the IOAM data. The transmit nodes update one or more of the IOAM data fields and populate the IOAM trace data based on the IOAM trace type. Each node is defined within an IOAM namespace. The IOAM namespace is defined by a namespace identifier (ID), which is part of the IOAM header. The namespace ID allows devices (e.g., routers) which are IOAM capable to determine whether the IOAM option types need to be processed by a device, which IOAM option type needs to be processed/updated in the event there are multiple IOAM option types in the packet, and whether the IOAM option type has to be removed from the packet. The IOAM namespace also supports several different uses including, for example, to distinguish different operational domains, provide context for IOAM data fields, and to identify different sets of devices in a deployment.

Tracing data is collected at each IOAM transit node that a packet traverses along a path. The following types of information can be collected using IOAM tracing: identification of the IOAM node, identification of the interface that a packet was received on, identification of the interface that a packet was set out on, the time of day when the packet was processed by the node and any transit delay, generic data, and information to detect whether IOAM trace data was added at a hop. Trace options, whether pre-allocated or incremental, consist of a "trace option header" and a variable data space called a "node data list," together referred to as the IOAM header and data structure 501. The trace option header portion includes namespace-ID field 502, NodeLen field 504, Flags field 506, RemainingLen field 508, IOAM Trace Type field 510 and Reserved field 512. The node data list portion stores the content of each node gathered from the nodes as the packet traverses the network domain.

With reference to the IOAM header portion of the IOAM header and data 501, the namespace-ID field 502 is a 16-bit identifier known to all nodes implementing IOAM. The NodeLen field 504 is a 5-bit unsigned integer that specifies the length of data added by each node. The flags field 506 is a 4-bit field that are allocated by IANA. Currently, bit 0 is an overflow bit (or 0-bit). The RemainingLen field 508 is a 7-bit unsigned integer that specifies the data space remaining for recording the node data before the node data list is considered to have overflowed. The IOAM trace type field 510 is also a bit field, where each used bit indicates specifics about a node. For example, when bit 0 is set, it indicates the presence of Hop_Lim and node_id in the node data. The reserved field 512 is 8-bits and is ignored by transit nodes.

Referring to the variable data space portion of the IOAM header and data structure 501, the node data list field 514 is a variable length field. The node data list field 514 is a list of node data elements where the content of each node data element is determined by the IOAM trace type. Each node prepends its node data element in front of the node data elements that it received, such that the transmitted node data list begins with the current node's data element as the first populated element in the list. The last node data element in the list is the node data of the first IOAM capable node in the path.

With continued reference to FIG. 5, since the forwarding behavior in SRv6 networks is determined based on SRH, the SRH 300 of a data packet may be used to independently create the probing packet 500. That is, the probing packet 500 may be formed by encapsulating the IOAM header and data structure 501 into an independent packet that is separate from the corresponding data packet, but which shares the same SRH In one embodiment, the probing packet 500 is an active measurement packet. In active measurement, probe packets are introduced into the network and dispatched to one or more network nodes. Active measurement is most commonly used to determine the performance properties of the path between the source and the node(s), and/or the performance properties of the destination node(s) themselves. Determining these properties is essential for network management purposes including anomaly detection, network health monitoring, SLA conformance monitoring, and root cause analysis.

Accordingly, forming the probing packet 500 using an IOAM header and data structure 501 as the UDP payload data retains the benefits of in-situ measurement, while avoiding issues in other measurement mechanisms, such as described in [I-D.ietf-6man-spring-srv5-oam], [RFC8762], [1-D.ali-spring-ioam-serv6] and [RFC8200], the contents of which are hereby incorporated by reference. In one embodiment, the probing packet 500 may be processed over a slower path than the corresponding data packet, while maintaining the ability to collect performance measurements on the same path.

In a further embodiment, the measurement mechanism using the probing packet 500 supports other applications. For example, the mechanism can be used to support network-wide telemetry coverage by using pre-planned paths, such as described in [I-D.tian-bupt-inwt-mechanism-policy], the contents of which are hereby incorporated by reference. Additionally, the mechanism may be used to actively measure the backup paths for SRv6 traffic engineering, and support two-way or round-trip measurement by setting the path end as the path head in SRH.

In one example embodiment, in-situ active measurement in an SRv6 network is disclosed. The example embodiment is discussed with reference to FIGS. 1B and 5, and is simply one non-limiting example of collecting measurement data in the network. In the probing packet 500, the next header field 503 of the SRH 300 is set to UDP. As previously explained, in one embodiment, a dedicated destination UDP port (e.g., destination port field 404) can be reserved to further verify this packet is an active probing packet and the UDP payload encapsulates the IOAM header and data. The SRH 300 also sets a bit (e.g., the T-flag bit) in the 8-bit flags field 505 to designate the packet as a dedicated probing packet for active measurement.

In the depicted network 102, the SR nodes 108A, 108B, 108C, 108D may be routers that are configured to route probing packets 500 between edge node 106A and edge node 106B. For purposes of discussion, we assume SR nodes 108A, 108B, 108C, 108D are all SRv6 endpoints nodes, where SR node 108A is the head node of the SRv6 path and network node 109D is the end node of the SRv6 path. In the embodiment, non-SR nodes may also exist between two of the SRv6 endpoints. These non-SR nodes only process the IPv6 header 200, but not the SRH 300 in the probing data packet 500. Accordingly, non-SR nodes may be ignored for purposes of this example.

To measure the SR path 108A→108B→108C→108D (e.g., collect IOAM data on the SR path), the probing packet 500 is constructed at node 108A. The source address field 214 is set as the address of the SR source node and the destination address field 216 is set as the address of first SR segment endpoint node (in this case, SR segment endpoint node 108B). The SRH lists the SR segment endpoint nodes (108A, 108B, 108C, 108D) for which IOAM data will be collected in the segment list field 507. Each SR node on the SR path, when detecting the T-flag of flags field 312 is set in the probing packet 500, will parse the UDP packet structure 400, including the IOAM header and data structure 501. Each SR node will also process the SRH 300. Data is added to the node data last 514 as directed by the IOAM header and data structure 501. As the probing packet 500 traverses the SR path, the destination address 216 is updated to the next SR segment endpoint node and the process is repeated until the last SR segment endpoint node is reached (in this case, SR segment endpoint node 108D). In one embodiment, if an SR segment endpoint node on the SR path is incapable of processing the probing packet 500, the T-flag is ignored and the packet is forwarded to the next node. The collected data may then be exported and analyzed.

More specifically, to collect and measure data on the SR path using the probing packet 500, the IPv6 header 200 sets the source IP address to the network node 108A address and the destination IP address to the network node 108B address of SR network 102. The next header, the SRH 300, sets the next header field 302 to UDP, and the flags field 312 is to set to the T-flag bit. The segment list field 316, which lists the 128-bit IPv6 addresses of the segments in reverse order (e.g., the addresses of 108D, 108C, 108B), sets the segments left field 308 to '2'. For example, the segment list (108D, 108C, 108B) may be indexed by (0, 1, 2), respectively, such that the segment left field 308 can be used as the index to identify which address should be copied to the IPv6 destination address field 216. In this case, since the segments list=2 (i.e., segment list 108B corresponds to index 2), the SR node 108B address is set in the destination address field 216 of the IPv6 header 200.

Since the next header 503 is set to UDP, the next header in the probing packet 500 is the UDP packet structure 400. In an optional embodiment, the destination port field 507 is set to indicate the IOAM trace type. Additionally, and as discussed above, the UDP data field 410 is replaced with the IOAM trace header and data structure 501. Accordingly, at network node 108A, the IOAM data of the node is added to the node data list 514, and the probing packet 500 is forwarded to the next SR node 108B.

At the SR node 108B, the node examines and processes the SRH 300. Initially, the segments left field 308 is decremented by 1, such that there is a one (1') segment remaining. Using an index of '1' to access the segment list 316, SR node 108C is identified as the next destination node. Accordingly, the SR node 10C address is copied into the destination address field of the IPv6 header 200 to replace the current address of SR node 108B. Network node 108B then identifies the flags field 312 being set to T-flag, and parses the UDP packet structure 400. In an optional embodiment, the destination port field 507 is set to indicate the IOAM trace type. Additionally, and as discussed above, the UDP data field 410 is replaced with the IOAM trace header and data structure 501. Accordingly, at SR node 108B, the IOAM data of the node is added to the node data list 514, and the probing packet 500 is forwarded to the next SR node 108C.

The process at the SR node 108C operates the same as at the SR nodes 108B. Accordingly, the network node 108C processes the SRH 300, decrements the segment left field 308 by 1 to equal 0 such that the next network on the SR path is the SR node 108D. The SR node 108D address is copied to the IPv6 header 200 destination address field 216 to replace the network node 108Cs address. Processing the flags field 312, next header field 302 and IOAM header and data structure 501 is the same as SR node 108B, and the probing packet 500 is forwarded to the network node 108D.

Upon examination of the probing packet 500 at SR node 108D, the segments left field 308 is now determined to be zero, which identifies the SR node 108D as the last node in the SR path. Thus, after completing parsing of the flags field 312 and the UDP header and the IOAM header of the IOAM header and data structure 501, the IOAM data of the SR node 108D is added to the node data list 514. The probing packet 500 is terminated, and an optional export packet containing the collected IOAM data (and other associated information) may be generated and sent out for analysis.

Example Use Cases of SRv6 Probing Packet

In one example embodiment, the probing packet 500 may be applied to IOAM in SRv6. In order to collect on-path data for a specific flow in a SR network, a copy of the SRH from the data flow packet may be used to construct the probing packets. The probing packet rate can match the original flow or arbitrarily/randomly configured. In this case, the edge of the SR domain terminates the probing packet 500 to avoid leakage.

In another example embodiment, and to support SRv6 traffic engineering, alternative paths may be pre-computed. Measuring the performance of these alternative paths enables the "best" path to be picked when a flow is swapped. Since each path can be represented by an SRH, the probing packet 500 can be constructed using these SRHs to actively measure their status and performance.

In a further example embodiment of an SRv6 network, a round trip measurement may be performed by setting the starting node and the end node of a path to the same segment source node, and setting the destination node as an intermediate node on the path.

In still another embodiment, and to collect the network wide telemetry data and gain global visibility within a SRv6 domain, the algorithm described in [I-D.tian-bupt-inwt-mechanism-policy], the contents of which are hereby incorporated by reference, may be applied to calculate the optimal SR paths and construct probing packets 500 on these paths.

FIG. 6 illustrates an example flow diagram of measuring performance in a segment routing network. In the discussion that follows, an SR node, such as the SR node 108A, performs the procedures. However, it is appreciated that any other functional unit or processing unit (such as node 800 and processor 820, or processor 904) may implement the processes described herein, and the disclosure is not limited to implementation by the source node and processor.

At step 602 of the process, the SR node receives a packet. The received packet includes the IP header 200 which consists of a source address field 214 and a destination address field 216. As described above, the IPv6 header also includes version, traffic class, flow label, payload length, next header and hop limit fields 202-212. In one embodiment, the source address of the source address field 214 is an address of a SR source node and a destination address of the destination address field 216 is an address of a SR segment destination node. In a further embodiment, the probing packet originates at the source address of a SR source node and terminates at the destination address of a SR destination node at an end of a SR path.

The packet is modified by the SR node by adding the SRH 300 to the IPv6 header 200 of the received packet, at step 604. The SRH 300 includes, for example, a next header field 302 set to a user datagram protocol (UDP) and a flags field 312 identifying the packet as a probing packet. Other fields SRH fields include a hdr ext len field 304, a routing type field 306, a segments left field 308, a last entry field 310 and a tag field 314. The SRH 300 also includes a segment list 316 that consists of the addresses for each of the segments in the list. In one embodiment, the SRH 300 lists the SR segment endpoint nodes for which the probing packet will measure and collect data.

At step 606, the node encapsulates a header and node data list of the IOAM header and data structure 501 in the payload data of the UDP header packet structure 400. The UDP header packet structure 400 is an extension header of the modified packet (i.e., the IPv6 header 200 and the SRH 300). In one embodiment, the encapsulated header and node data list is one of an in-situ operations, administration and management (IOAM) header, an IOAM edge-to-edge (E2E) header, an IOAM DEX header or a telemetry header as defined by the value of the destination port field. Additionally, in one embodiment, the UDP header further includes a source port field used as a sequence number to track the probing packet on a SR path, and a destination port field with a modifiable value to define the payload type.

At step 608, the probing packet is forwarded to a next SR node in the SR network.

FIG. 7 illustrates another example flow diagram of measuring performance in a segment routing network. In the discussion that follows, a SR node, such as SR node 108A, performs the procedures. However, it is appreciated that any other functional unit or processing unit (such as node 800 and processor 820, or processor 904) may implement the processes described herein, and the disclosure is not limited to implementation by the source node and processor.

In particular, the flow diagram illustrates an example embodiment of the destination port field 404 used to further identify the packet as a probing packet 500. At step 702, the node matches a value of the destination port field 404 in the probing packet 500 to a value of a destination port of the SR node. When the flags field 312 is set to indicate the packet is the probing packet and the value of the destination port field 404 matches the value of the destination port of the SR node, the UDP header and the encapsulated header are parsed to add data to the node data list, at step 704.

Figure 8:
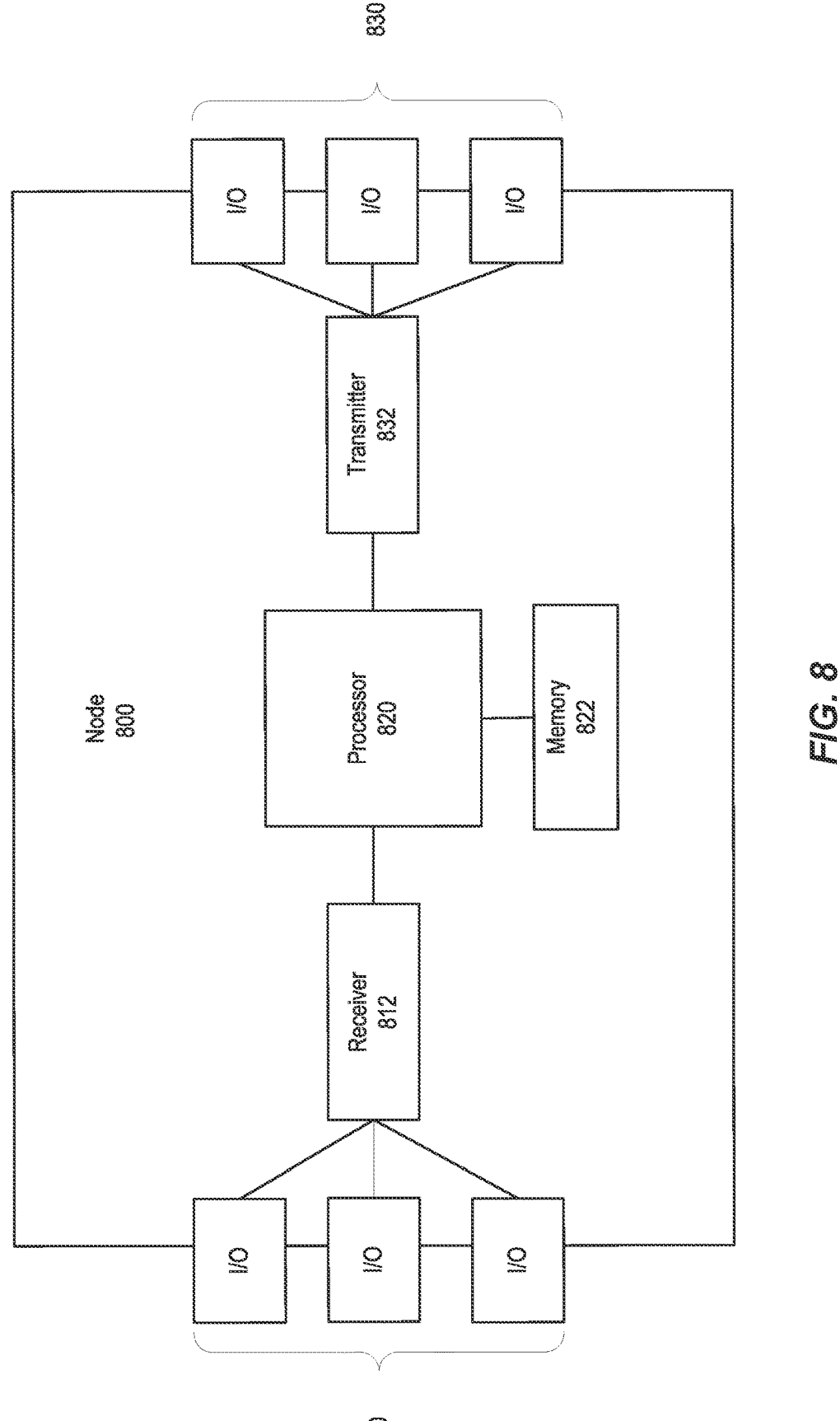
FIG. 8 illustrates an embodiment of a network node.

FIG. 8 illustrates an embodiment of a network node. The node 800 may be, for example, a node 108, or any other network component as described above in system 100. The node 800 may comprise a plurality of input/output ports 810/830 and/or receivers (Rx) 812 and transmitters (Tx) 832 for receiving and transmitting data from other nodes, a processor 820 to process data and determine which node to send the data to and memory. The node 800 may also generate and distribute data in the form of data packets in the network. Although illustrated as a single processor, the processor 820 is not so limited and may comprise multiple processors. The processor 820 may be implemented as one or more central processing unit (CPU) chips, cores (e.g., a multi-core processor), field-programmable gate arrays (FP-GAs), application-specific integrated circuits (ASICs), and/or digital signal processors (DSPs), and/or may be part of one or more ASICs. Moreover, the processor 820 may be implemented using hardware, software, or both. The memory 822 may be configured to store routing tables, forwarding tables, or other tables or information disclosed herein. Although illustrated as a single memory, memory 822 may be implemented as a combination of read-only memory (ROM), random access memory (RAM), or secondary storage (e.g., one or more disk drives or tape drives used for non-volatile storage of data). The technology described above may also be implemented on any general-purpose network component, such as a computer or network component with sufficient processing power, memory resources, and network throughput capability to handle the necessary workload placed upon it.

Figure 9:
FIG. 9 illustrates a schematic diagram of a general-purpose network component or computer system.

FIG. 9 shows an example embodiment of a computing system for implementing embodiments of the disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random-access memory component, a read-only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, instructions 920 may reside, completely or partially, within machine-readable medium 928. In another example, instructions 920 may reside, completely or partially, within processor 904.

Computer system 900 may also include an input device 932. In one example, a user of computer system 900 may enter commands and/or other information into computer system 900 via input device 932. Examples of an input device 932 includes, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, instructions 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications, and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid-state storage media and specifically excludes signals. It should be understood that the software can be installed in and sold with the device. Alternatively, the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of generating and transmitting a probing packet for determining in-situ performance in a segment routing (SR) network, comprising:
   receiving a packet at a SR network node having an IPV6 packet header;
   generating the probing packet to include the IPV6 packet header, a segment routing header (SRH) extension header, and a user datagram protocol (UDP) header structure and UDP data payload portion wherein the SRH extension header includes a flag bit to identify the packet as a probing packet;
   wherein the UDP payload portion includes an office administration and management (OAM) header and an in-situ operations, administration and management (IOAM) data structure; and
   transmitting the probing packet to a next segment node in the SR network.

2. The method of claim 1, wherein
   an IP header of the received packet includes a source address field and a destination address field, wherein a source address is an address of a SR source node and a destination address is an address of a SR segment endpoint node.

3. The method of claim 1, wherein the probing packet originates at the source address of a SR source node and terminates at the destination address of a SR endpoint node at an end of a SR path.

4. The method of claim 1, wherein the SRH extension header lists SR segment endpoint nodes for which the probing packet will measure and collect data.

5. The method of claim 1, wherein the UDP header further includes a source port field used as a sequence number to track the probing packet on a SR path.

6. The method of claim 1, wherein the UDP header further includes a destination port field to define a payload type.

7. The method of claim 6, further comprising modifying, by the SR node, a value of the destination port field to define the payload type.

8. The method of claim 7, wherein the OAM header is one of an in-situ operations, administration and management (IOAM) header, an IOAM edge-to-edge (E2E) header, an IOAM DEX header or a telemetry header as defined by the value of the destination port field.

9. The method of claim 1 wherein the SRH extension header comprises a flag field identifying the packet as a probing packet.

10. The method of claim 1, further comprising
   matching a value of the destination port field to a value of a destination port of the SR node, and
   parsing, by the SR node, the UDP header and the OAM header to add data to a node data list when a flag field is set to indicate the packet is the probing packet and the value of the destination port field matches the value of the destination port of the SR node.

11. A segment routing node for generating and transmitting a probing packet for determining in-situ performance in a segment routing (SR) network, comprising:
   a non-transitory memory storage comprising instructions; and
   one or more processors in communication with the memory, wherein the one or more processors cause the segment routing node to execute the instructions to:
   receive a packet having an IPV6 packet header;
   generate the probing packet to include the IPV6 packet header, a segment routing header (SRH) extension header wherein the SRH extension header includes a flag bit to identify the packet as a probing packet, and a user datagram protocol (UDP) header structure and UDP data payload portion;
   wherein the UDP payload portion includes an office administration and management (OAM) header and an in-situ operations, administration and management (IOAM) data structure; and
   transmitting the probing packet to a next segment node in the SR network.

12. The segment routing node of claim 11, wherein
   an IP header of the received packet includes a source address field and a destination address field, wherein
   a source address is an address of a SR source node and a destination address is an address of a SR segment endpoint node.

13. The segment routing node of claim 12, wherein the probing packet originates at the source address of a SR source node and terminates at the destination address of a SR endpoint node at an end of a SR path.

14. The segment routing node of claim 11, wherein the SRH extension header lists SR segment endpoint nodes for which the probing packet will measure and collect data.

15. The segment routing node of claim 11, wherein the UDP header further includes a source port field used as a sequence number to track the probing packet on a SR path.

16. The segment routing node of claim 11, wherein the UDP header further includes a destination port field to define a payload type.

17. The segment routing node of claim 16, wherein the one or more processors further cause the segment routing node to execute the instructions to modify a value of the destination port field to define the payload type.

18. The segment routing node of claim 11, wherein the SRH extension header comprises a flag field identifying the packet as a probing packet.

19. The segment routing node of claim 13, wherein the one or more processors further cause the segment routing node to execute the instructions to:

match a value of a destination port field to a value of a destination port of the SR node, and parse the UDP header and the OAM header to add data to a node data list when a flag field is set to indicate the packet is the probing packet and the value of the destination port field matches the value of the destination port of the SR node.

20. A non-transitory computing-readable medium storing computer instructions for generating and transmitting a probing packet for determining in-situ performance in a segment routing (SR) network, that when executed by one or more processors, cause the one or more processors to perform the steps of:

receiving a packet at a SR network node having an IPV6 packet header;

generating the probing packet to include the IPV6 packet header, a segment routing header (SRH) extension header wherein the SRH extension header includes a flag bit to identify the packet as a probing packet, and a UDP header structure and a user datagram protocol (UDP) data payload portion wherein the UDP payload portion includes an office administration and management (OAM) header and an in-situ operations, administration and management (IOAM) data structure; and transmitting the probing packet to a next segment node in the SR network.

* * * * *